United States Patent
Huber et al.

(10) Patent No.: US 12,131,841 B2
(45) Date of Patent: Oct. 29, 2024

(54) FORMULATION FOR PRODUCING AN INSULATING SYSTEM, ELECTRICAL MACHINE AND METHOD FOR PRODUCING AN INSULATING SYSTEM

(71) Applicant: Innomotics GmbH, Nuremberg (DE)

(72) Inventors: Jürgen Huber, Erlangen (DE); Steffen Lang, Hallerndorf (DE); Niels Müller, Nuremberg (DE); Igor Ritberg, Fürth (DE); Matthias Übler, Ursensollen (DE)

(73) Assignee: INNOMOTICS GMBH, Nuremberg (DE)

( * ) Notice: Subject to any disclaimer, the term of this patent is extended or adjusted under 35 U.S.C. 154(b) by 1072 days.

(21) Appl. No.: 16/968,055

(22) PCT Filed: Feb. 7, 2019

(86) PCT No.: PCT/EP2019/053048
§ 371 (c)(1),
(2) Date: Aug. 6, 2020

(87) PCT Pub. No.: WO2019/154932
PCT Pub. Date: Aug. 15, 2019

(65) Prior Publication Data
US 2021/0035705 A1    Feb. 4, 2021

(30) Foreign Application Priority Data
Feb. 9, 2018    (DE) .................. 10 2018 202 058.2

(51) Int. Cl.
*H01B 3/40*      (2006.01)
*C08G 77/04*    (2006.01)
(Continued)

(52) U.S. Cl.
CPC ............... *H01B 3/46* (2013.01); *C08G 77/04* (2013.01); *C09D 5/03* (2013.01); *H01B 3/44* (2013.01);
(Continued)

(58) Field of Classification Search
CPC ...................................... H01B 3/40
See application file for complete search history.

(56) References Cited

U.S. PATENT DOCUMENTS 6,242,096 B1   6/2001  Wolter ............... C07F 7/08
8,871,343 B2  10/2014  Kikuchi et al. ........... 428/372
(Continued)

FOREIGN PATENT DOCUMENTS

| | | | |
|---|---|---|---|
| AT | 288715 B | 3/1971 | ............ C08G 59/12 |
| CN | 1854221 A | 11/2006 | .......... C09D 179/08 |

(Continued)

OTHER PUBLICATIONS

U.S. Non-Final Office Action, U.S. Appl. No. 16/968,406, 22 pages, Nov. 26, 2021.
(Continued)

*Primary Examiner* — Chau N Nguyen
(74) *Attorney, Agent, or Firm* — Slayden Grubert Beard PLLC (57) ABSTRACT

Various embodiments include a sprayable formulation for an insulation system of an electrical machine, the formulation comprising a sprayable resin mixture including: a monomeric and/or oligomeric, at least diepoxidic carbon-based first resin component; and a monomeric and/or oligomeric second resin component based on alkyl-/arylpolysiloxane with at least one glycidyl ester and/or glycidyl ether functionalities; and a curing agent and based on at least one of: anhydride, (poly)amine, and amino- and/or alkoxy-functional alkyl-/arylpolysiloxane.

13 Claims, 2 Drawing Sheets

(51) Int. Cl.
*C09D 5/03* (2006.01)
*H01B 3/44* (2006.01)
*H01B 3/46* (2006.01)
*H02K 3/30* (2006.01)
*B82Y 30/00* (2011.01)
*H01B 3/30* (2006.01)

(52) U.S. Cl.
CPC ............... *H02K 3/30* (2013.01); *B82Y 30/00* (2013.01); *C08G 2150/20* (2013.01); *H01B 3/302* (2013.01)

(56) References Cited

U.S. PATENT DOCUMENTS

| | | | |
|---|---|---|---|
| 8,927,865 B2 | 1/2015 | Hanawa et al. | 174/110 R |
| 10,950,365 B2 | 3/2021 | Hanawa et al. | |
| 2001/0048355 A1 | 12/2001 | Irwin | H01F 7/00 |
| 2003/0113441 A1 | 6/2003 | Baumann | B05D 5/12 |
| 2003/0113465 A1 | 6/2003 | Baumann et al. | 427/425 |
| 2004/0197563 A1* | 10/2004 | Kye | C09J 163/00 428/413 |
| 2006/0124693 A1* | 6/2006 | Meloni | B32B 15/20 228/56.3 |
| 2007/0213492 A1 | 9/2007 | Mowrer | C01G 77/06 |
| 2012/0145432 A1 | 6/2012 | Yamaguchi et al. | 174/110 SR |
| 2012/0222884 A1 | 9/2012 | Honda et al. | 174/120 SR |
| 2013/0203897 A1 | 8/2013 | Kornmann et al. | 523/459 |
| 2014/0326481 A1 | 11/2014 | Gröppel | H01B 3/04 |
| 2015/0001983 A1 | 1/2015 | Hildinger et al. | 310/196 |
| 2015/0279510 A1 | 10/2015 | Hanawa et al. | 428/372 |
| 2016/0160081 A1* | 6/2016 | Klotzbach | C09D 183/04 524/858 |
| 2016/0272809 A1 | 9/2016 | Takeuchi | 523/456 |
| 2016/0369043 A1* | 12/2016 | Mason | C08G 59/5033 |
| 2017/0253779 A1* | 9/2017 | Schlechte | C08G 59/50 |

FOREIGN PATENT DOCUMENTS

| | | | |
|---|---|---|---|
| CN | 102585663 A | 7/2012 | ............ C09D 163/00 |
| CN | 102682884 A | 9/2012 | ............ H01B 7/02 |
| CN | 102708953 A | 10/2012 | ............ H01B 13/00 |
| CN | 104637628 A | 5/2015 | ............ H01B 13/00 |
| CN | 104952516 A | 9/2015 | ............ C09D 5/24 |
| CN | 105 449 955 | 3/2016 | ............ H02K 15/10 |
| CN | 105900183 A | 8/2016 | ............ H01B 3/30 |
| CN | 106009527 A | 10/2016 | ............ C08G 59/42 |
| CN | 107545948 A | 1/2018 | ............ H01B 13/02 |
| DE | 196 50 288 | 7/1998 | ............ C09D 183/06 |
| DE | 10 2011 083 228 | 3/2013 | ............ H01B 3/04 |
| DE | 10 2012 205 563 | 10/2013 | ............ H02K 3/40 |
| EP | 1 354 916 | 10/2003 | ............ C08L 63/02 |
| EP | 3 217 410 | 9/2017 | ............ H01B 7/08 |
| JP | 2010 074 908 | 4/2010 | ............ H02K 3/34 |
| RU | 2076361 C1 | 3/1997 | ............ G21F 9/18 |
| RU | 2524599 C2 | 7/2014 | ............ C08F 29/06 |
| SU | 399142 A3 | 9/1973 | ............ C08G 59/12 |
| WO | 97 43816 | 11/1997 | ............ H02K 3/24 |
| WO | 98 32138 | 7/1998 | ............ H01B 3/40 |
| WO | 01 48895 | 7/2001 | ............ H02K 15/10 |
| WO | 2010/112491 A1 | 10/2010 | ............ C08F 290/06 |
| WO | 2013 045224 | 4/2013 | ............ H02K 3/40 |
| WO | 2019 057601 | 3/2019 | ............ H02K 3/30 |

OTHER PUBLICATIONS

Russian Office Action, Application No. 2020128156/07, 7 pages, Mar. 4, 2021.
Search Report for International Application No. PCT/EP2018/053048, 10 pages, May 31, 2019.
Search Report for International Application No. PCT/EP2018/053049, 10 pages, Jun. 11, 2019.
Office Action for DE Application No. 10 2018 202 061.2, 7 pages, Jan. 15, 2019.
Search Report for International Application No. PCT/EP2018/081955, 10 pages, May 31, 2019.
Office Action for DE Application No. 10 2018 202 058.2, 9 pages, Aug. 23, 2018.
Chinese Office Action, Application No. 201980012041.3, 21 pages, Jun. 3, 2021.
Russian Office Action, Application No. 2020128157/07, 8 pages, Mar. 18, 2021.
Chinese Office Action, Application No. 201980012071.4, 19 pages, Apr. 27, 2021.

\* cited by examiner

FORMULATION FOR PRODUCING AN INSULATING SYSTEM, ELECTRICAL MACHINE AND METHOD FOR PRODUCING AN INSULATING SYSTEM

CROSS-REFERENCE TO RELATED APPLICATIONS

This application is a U.S. National Stage Application of International Application No. PCT/EP2019/053048 filed Feb. 7, 2019, which designates the United States of America, and claims priority to DE Application No. 10 2018 202 058.2 filed Feb. 9, 2018, the contents of which are hereby incorporated by reference in their entirety.

TECHNICAL FIELD

The present disclosure relates to insulation systems. Various embodiments may include systems for an electrical machine, especially a rotating electrical machine in the high-voltage or mid-voltage sector, for example a generator and/or a motor, which is subjected to relatively high rated voltages at operating voltages, i.e., for example, over and above 1 kV or more, and electrical machines with an insulation system producible at least partly from the formulation.

BACKGROUND

Ever higher-power electrical machines, for example generators, are being developed since advancing technology is requiring ever higher power densities. A high-power generator, for example a turbo generator, especially has a stator with a stator lamination stack and a multitude of generator grooves containing the generator insulation system, generally in the form of a winding. The main insulation of generators, based on epoxy resin-impregnated mica tapes, ensures shielding of the conductors that are under high voltage, especially copper conductors, against the grounded stator. It has a high partial discharge use voltage, which enables it to dissipate 3.5 kV per millimeter, for example, over a prolonged period.

The most important constituents of the insulation system, viewed from the inside outward, are the conductors, especially copper conductors, i.e. the electrical coil, that are compressed with one another to form what are called Roebel bars, optionally an internal potential controller applied to the bars, the main insulation, and the outer corona shield thereon, and optionally a terminal corona shield.

The generator winding and/or motor winding leaves the generator grooves at each end of the lamination stack. At these points, what is called a terminal corona shield is subsequently mounted on the outer corona shield in order to control the electrical potential, for example to raise the potential over the length of the terminal corona shield. All these constituents of the insulation system, i.e. internal potential controller, main insulation, outer corona shield and terminal corona shield, have to date generally been wound as tapes onto the conductor components, with parts thereof, such as the terminal corona shield, being applied completely by hand. The other parts cannot be applied in an automated manner either, either because the quantity means that automation is uneconomic and/or the risk of trapped air in the folds means that the quality required in the winding is not assured. Once all the windings of the insulation system have been made, they are impregnated with impregnation resin, then the impregnated insulation is cured—for example in an oven—to give the thermoset.

The operation of the electrical rotating machine gives rise to high voltages that have to be dissipated in the insulation volume between the conductor bar at high voltage and the lamination stack at ground potential. Excess increases in field occur here at the edges of the laminations in the lamination stack, and these in turn cause partial discharges. When they meet the insulation system, these partial discharges lead to very significant local heating. This breaks down the organic materials of the insulation system gradually to low molecular weight, volatile products, for example to $CO_2$. The tapes that are wound generally consist of bonded mica platelets which, in the insulation, serve to extend the erosion pathway in the insulation system, i.e. the direct path from the high-voltage side, i.e. the conductors, to the grounded lamination stack, which results in a much longer lifetime of an insulation system.

SUMMARY

The teachings of the present disclosure include methods to minimize the costs of production of an insulation system for a rotating electrical machine of the high-voltage or mid-voltage sector, for example a generator and/or motor, which is subjected to relatively high rated voltages at operating voltages, i.e., for example, over and above 1 kV or more. For example, some embodiments include a sprayable formulation for an insulation system of an electrical machine, especially a rotating electrical machine in the high-voltage or mid-voltage sector, for example a generator and/or a motor, which is subjected to relatively high rated voltages at operating voltages, i.e., for example, over and above 1 kV or more, wherein the formulation includes a sprayable resin mixture comprising, as well as a monomeric and/or oligomeric, at least diepoxidic carbon-based resin component, also a monomeric and/or oligomeric resin component based on alkyl-/arylpolysiloxane with at least one glycidyl ester and/or glycidyl ether functionalities and optionally also one or more compounds that are usable as curing agent and are based on anhydride and/or (poly)amine and/or based on amino- and/or alkoxy-functional alkyl-/arylpolysiloxane.

In some embodiments, the formulation is sprayable as a powder coating, i.e. in solid form at room temperature and/or standard pressure.

In some embodiments, the formulation is in liquid form at room temperature and/or standard pressure.

In some embodiments, the formulation also comprises solvent.

In some embodiments, the formulation is free of solvent.

In some embodiments, the formulation is in the form of a resin-curing agent mixture.

In some embodiments, the formulation includes as curing agent, a di- and/or trianhydride and/or one or more derivatives thereof.

In some embodiments, there is, as curing agent, a difunctional and/or higher-functionality amine and/or one or more derivatives thereof.

In some embodiments, there are one or more filler fraction(s).

In some embodiments, there are one or more nanoparticulate filler fraction(s) and at least one additive.

In some embodiments, at least one additive by means of which at least partial sintering of the nanoparticles to form a barrier layer is effected in the event of electrical partial discharges is provided.

As another example, some embodiments include an electrical rotating machine comprising a conductor (13), a lamination stack (12), an insulation system, a main insulation (11), an internal potential controller, an outer corona shield and/or a terminal corona shield, wherein the insulation system is obtainable at least partly by one or more spraying operations of a formulation as described herein to a conductor (13), followed by curing.

As another example, some embodiments include a process for producing an insulation system of an electrical rotating machine using a formulation as described herein.

As another example, some embodiments include a process for producing an insulation system of an electrical rotating machine, comprising the following process steps:
 a) producing a formulation as described above,
 b) spraying the formulation onto a conductor (13),
 c) drying and/or partly gelating the formulation on the conductor,
 d) repeating process steps b) and c) once or more than once, and
 e) curing the formulation to form the insulation.

In some embodiments, the method comprises a process step for driving out the solvent inserted between operating steps c) and d).

In some embodiments, the method is at least partly automatable.

In some embodiments, the method is conducted at least partly in an automated manner.

In some embodiments, process steps b) to d) are conducted in an automated manner.

DETAILED DESCRIPTION

In some embodiments, there is a sprayable formulation for an insulation system of an electrical machine, especially a rotating electrical machine in the high-voltage or mid-voltage sector, for example a generator and/or a motor, which is subjected to relatively high rated voltages at operating voltages, i.e., for example, over and above 1 kV or more, wherein the formulation includes a sprayable resin mixture comprising, as well as a monomeric and/or oligomeric, at least diepoxidic carbon-based resin component, also a monomeric and/or oligomeric resin component based on methyl-/phenylpolysiloxane with at least diglycidyl ester and/or diglycidyl ether functionalities and/or also one or more compounds that are usable as curing agent and are based on anhydride and/or (poly) amine and/or based on amino- and/or alkoxy-functional methyl-/phenylpolysiloxane. In some embodiments, the formulation additionally also comprises fillers that are so small that they are applicable through a spray nozzle.

It is possible to dispense with mica platelets as conventionally used in all tape and/or wound insulations, which are not sprayable because they are simply too large, when the resin basis used is a resin and/or a resin mixture having partial discharge resistance. The resistance of a sprayable resin is increased by addition of fillers, especially of mineral fillers, when at least some of the resin is exchanged for a partial discharge-resistant component. For instance, it is possible to dispense with the use of the large mica platelets stuck to the tape and to formulate and produce the insulation material in the form of a sprayable solution.

Partial discharge-resistant resins and resin mixtures are, for example, those in which the polymeric constituent present is a component with a $—[SiR_2—O]_n—$ backbone as secondary constituent of the resin mixture and/or resin-curing agent mixture, i.e. to an extent of less than 50 mol %, especially to an extent of less than 40 mol % and very preferably to an extent of less than 30 mol % of the polymerizable resin mixture and/or resin-curing agent mixture. Resin mixtures and/or resin-curing agent mixtures used to date for electrical insulations and especially also as impregnation resins for wrapping tape insulations have typically been carbon-based epoxy resins which, in liquid form, bear any possible functional groups, for example including epoxy groups, on a carbon-based-$[—CH_2-]_n—$ backbone. These are reacted with curing agent to give a thermoset that forms an encapsulation and/or, for example, the impregnation of the wrapping tape insulation.

In some embodiments, the resin mixture and/or resin-curing agent mixture for the insulation material includes a resin and/or a resin mixture in which at least some of the resin mixture and/or resin-curing agent mixture for the insulation system that cures to give a thermoset is a siloxane-containing compound that forms a $—[SiR_2—O]_n—$ backbone in the thermoset. "R" here represents all kinds of organic radicals that are suitable for curing and/or cross-linking to give an insulant usable for an insulation system. More particularly, R represents -aryl, -alkyl, -heterocycles, nitrogen-, oxygen- and/or sulfur-substituted aryls and/or alkyls.

In some embodiments, R may be the same or different and may represent the following groups:
 alkyl, for example -methyl, -propyl, -isopropyl, -butyl, -isobutyl, -tert-butyl, -pentyl, -isopentyl, -cyclopentyl and all other analogs up to dodecyl, i.e. the homolog having 12 carbon atoms;
 aryl, for example: benzyl-, benzoyl-, biphenyl-, tolyl-, xylenes and comparable aromatics, especially, for example, all aryl radicals having one or more rings whose structure meets Hückel's definition of aromaticity,
 heterocycles: especially sulfur-containing heterocycles such as thiophene, tetrahydrothiophene, 1,4-thioxane and homologs and/or derivatives thereof,
 oxygen-containing heterocycles, for example dioxanes,
 nitrogen-containing heterocycles, for example those having —CN, —CNO, —CNS, —N3 (azide) substituents on the ring or on the rings, and
 sulfur-substituted aryls and/or alkyls: e.g. thiophene, but also thiols.

The Hückel rule for aromatic compounds relates to the correlation that planar, cyclically through-conjugated molecules comprising a number of Π electrons that can be represented in the form of 4n+2 possess exceptional stability which is also referred to as aromaticity.

In some embodiments, the resin mixture and/or resin-curing agent mixture, as well as the component in monomeric and/or oligomeric form that has been functionalized for polymerization and has a —[SiR$_2$—O]$_n$— backbone, also has at least one monomeric or oligomeric resin component that has been functionalized for polymerization and has a carbon-comprising backbone i.e. one comprising —[—CR$_1$R$_2$—]$_n$— units. R here represents -hydrogen, -aryl, -alkyl, -heterocycles, nitrogen-, oxygen- and/or sulfur-substituted aryls and/or alkyls. Especially suitable are, for example, epoxy-functionalized components such as bisphenol F diglycidyl ether (BFDGE) or bisphenol A diglycidyl ether (BADGE), polyurethane and mixtures thereof. Preference is given to epoxy resins based on bisphenol F diglycidyl ether (BFDGE), bisphenol A diglycidyl ether (BADGE) or mixtures thereof.

In some embodiments, the monomeric or oligomeric component functionalized for polymerization that has a —[SiR$_2$—O]$_n$— backbone is combined with one or more components containing a —[—CR$_1$R$_2$—]$_n$— backbone selected from the group of the following compounds to give the resin mixture and/or resin-curing agent mixture: undistilled and/or distilled, optionally reactively diluted bisphenol A diglycidyl ether, undistilled and/or distilled, optionally reactively diluted bisphenol F diglycidyl ether, hydrogenated bisphenol A diglycidyl ether and/or hydrogenated bisphenol F diglycidyl ether, pure and/or solvent-thinned epoxy novolak and/or epoxy phenol novolak, cycloaliphatic epoxy resins such as 3,4-epoxycyclohexylmethyl 3,4-epoxycyclohexylcarboxylate, e.g. CY179, ERL-4221; Celloxide 2021P, bis(3,4-epoxycyclohexylmethyl) adipate, e.g. ERL-4299; Celloxide 2081, vinylcyclohexene diepoxide, e.g. ERL-4206; Celloxide 2000, 2-(3,4-epoxycyclohexyl-5,5-spiro-3,4-epoxy)-cyclohexane-meta-dioxane, e.g. ERL-4234; diglycidyl hexahydrophthalate, e.g. CY184, EPalloy 5200; tetrahydrophthalic acid diglycidyl ether e.g. CY192; glycidated amino resins (N,N-diglycidyl-para-glycidyloxyaniline, e.g. MY0500, MY0510, N,N-diglycidyl-meta-glycidyloxyaniline, e.g. MY0600, MY0610, N,N,N',N'-tetraglycidyl-4,4'-methylenedianiline, e.g. MY720, MY721, MY725, and any mixtures of the aforementioned compounds.

Suitable monomeric or oligomeric components that have been functionalized for polymerization and have a —[SiR$_2$—O—]$_n$— backbone are glycidyl-based and/or epoxy-terminated aryl- and/or alkylsiloxanes, for example glycidoxy-functionalized, especially glycidoxy-terminated, siloxanes. For example, a suitable siloxane is one such as 1,3-bis(3-glycidyloxypropyl)-tetramethyldisiloxane, DGTMS, and/or glycidoxy-terminated phenyldimethylsiloxane and/or phenylmethylsiloxane in monomeric and/or oligomeric form, and in desired mixtures and/or in the form of derivatives. In place of the 4-methyl substituents on the silicon in DGTMS, there may be various identical or non-identical arbitrary alkyl and/or aryl substituents. One of these components that has already been tested is the commercial product "Silres® HP® 1250®". It has been found that at least difunctionalized siloxanes usable for production of thermosets are suitable here.

An example of a commercially available product is the following compound suitable as a siloxane-based component from Wacker AG:

Figure 1

Basic structure of SILRES HP 1250

In some embodiments, curing agents include cationic and anionic curing catalysts, for example organic salts, such as organic ammonium, sulfonium, iodonium, phosphonium and/or imidazolium salts, and amines, such as tertiary amines, pyrazoles and/or imidazole compounds. Examples of these include 4,5-dihydroxymethyl-2-phenylimidazole and/or 2-phenyl-4-methyl-5-hydroxymethyl-imidazole. It is alternatively possible to use compounds containing oxirane groups, for example glycidyl ethers, as curing agents. Just like the base resin, the curing agent may alternatively or additionally be wholly or partly replaced by a compound having a —[SiR$_2$—O—]$_n$— backbone, also called siloxane-based compound here.

In the case of non-homopolymerizing, for example addition-crosslinking, high polymers, di- or trianhydride (derivatives) that are solid at room temperature may be appropriate as curing agents, for example 3,3',4,4'-benzophenonetetracarboxylic dianhydride (BTDA, CAS No. 2421-28-5). For example, will be a phthalic anhydride derivative and/or a polyamine, and/or a product from Wacker AG, the alkyl- and/or aryl- and/or alkoxy-substituted Wacker HP 2000 or HP 2020.

Conventionally, acid anhydrides are also used successfully as curing agents in insulation materials. However, the toxicology thereof is now a matter of some controversy. Therefore, other curing agents, especially based on imidazole and/or pyrazole, are increasingly being used.

In some embodiments, the carbon-based curing agent is also wholly or partly replaced by siloxane-based curing agents having the same functionalities. In the insulation material comprising the cured base resin, a ratio of siloxane-based compound "with —[SiR$_2$—O—]$_n$— backbone" to carbon-based compound "with —[—CR$_1$R$_2$—]$_n$— backbone" such as 1:8 to 1:4 is the most favorable, meaning that, in the insulation material in question, the hydrocarbon-based compounds are present in 4 to 8 times the quantity of the —[SiR$_2$—O—]$_n$— backbone-containing compounds. The proportions are based here on the stoichiometry, i.e. are molar percentages. The siloxane-containing component is thus present in an amount of 10 to 50 mol % in the resin mixture and/or resin-curing agent mixture of the formulation. In some embodiments, the amount of siloxane-containing component in the base resin is not more than 20 mol %, especially not more than 18 mol % and more preferably not more than 15 mol %.

An optimum in the reduced erosion volume was found in the case of substitution of the conventional resin component of 20-30%. Since, however, the mechanical properties of the plastic worsen with increasing substitution, which is clearly apparent from the glass transition temperatures and/or the storage moduli, it is appropriate to substitute as little —[—CH$_2$—]$_n$— backbone as possible. In the case of about 20% substitution, the glass transition temperatures and storage moduli of the resulting resin system are almost identical to those of the conventional resin comprising solely —[—CH$_2$—]$_n$— backbone. There is a huge increase in the partial discharge resistance of the insulant by virtue of the presence of a certain amount of —[SiR$_2$—O—]$_n$— forming monomers or oligomers in the base resin.

In some embodiments, filler is also added to the formulation. For example, one or more fractions of filler are used. For example, filler fractions such as fine mica powder and/or other metal oxide ceramics such as aluminum oxide, silicon dioxide, but also aluminum nitrites, are used as fillers. The fillers are used, for example, in particle size fractions of 1-150 μm, especially of 10 to 120 μm, and/or in the range from 30 to 100 μm, because this increases the partial discharge resistance and in particular also the thermal conductivity of the insulation system. For example, one or more fractions of nanoparticulate filler are added, especially those based, for example, on quartz, SiO$_2$.

In some embodiments, an additive is additionally added, especially a sintering additive, for example based on an organic phosphorus compound. The organic phosphorus compound catalyzes the fusion and/or sintering of SiO$_2$ nanoparticles present simultaneously to form vitreous regions in the resin. For example, this generates a vitreous region as barrier layer in the insulation system.

In some embodiments, there is a combination of the sintering additive and the nanoparticulate filler in the formulation because this results in formation of glassy regions in the finished thermoset that show particularly good insulating action in the presence of an electrical discharge. The most recent exposure tests of such ready-cured insulants show an increase in lifetime by a factor of 8.

In some embodiments, a formulation for spraying for production of the insulation system is as follows:
  0.2% to 1.0% by weight of organic phosphorus compound, which may also be in the form of a mixture of multiple phosphorus compounds, 50% to 65% by weight of mica in pulverized form that may be in various grain sizes and/or grain forms,
  4% to 10% by weight of quartz nanoparticles that may likewise be in various fractions,
  10% to 25% by weight of curing agent that may be in anhydride-free or anhydride-containing form,
  8% to 25% by weight of conventional polymerizable carbon-based resin, i.e. forming a polymer with a —[—CH$_2$—]— backbone, and 2% to 8% by weight of a polymerizable silicon oxide-based resin that replaces corresponding proportions by weight of the polymerizable carbon-based resin.

In some embodiments, a formulation for formation of an insulation system producible by spraying comprises:
  0.3% to 0.7% by weight of an organic phosphorus compound,
  55% to 60% by weight of mica in pulverized form,
  5% to 9% by weight of quartz nanoparticles,
  12% to 20% by weight of curing agent,
  10% to 17% by weight of polymerizable carbon-based resin, i.e. forming a polymer with a —[—CH$_2$—]— backbone, and 2.5% to 6% by weight of a polymerizable silicon oxide-based resin that replaces corresponding proportions by weight of the polymerizable carbon-based resin.

A specific example of such a formulation is:
  0.5% by weight of organic phosphorus compound,
  58% to 60% by weight, especially 59.5% by weight, of mica, 8% by weight of quartz, SiO$_2$ nanoparticles,
  16% by weight of methylhexahydrophthalic anhydride, "MHHPA", as curing agent,
  12.8% by weight of bisphenol A diglycidyl ether DGEBA and
  3.2% by weight of epoxidized siloxane, e.g. Silres HP1250.

In some embodiments, by way of example, the epoxy resin component was stoichiometrically replaced gradually by various siloxane-containing components [1], [2] and [3]. The resultant insulation systems, specimens 2, 3 and 4, were exposed to specific and defined electrical discharges for test purposes. As specimen 1, a conventional insulation system without a —[SiR$_2$—O—]$_n$— backbone in the resin was compared to these specimens 2 to 4. After a particular time, the volumes eroded were scanned with a laser and hence the eroded volume—or the eroded depth of the insulation system—was evaluated.

The exposure parameters were room temperature, under air, duration of 100 hours, atmosphere of air at 50% RH and voltage 10 kV AC. It has been found that, even in the case of a low substitution level of 20% of the CH$_2$-based resin component, shown by the example of the epoxy-containing base resin DGEBA, for a —[SiR$_2$—O—]$_n$— containing monomer, it is possible to achieve a distinct increase in partial discharge resistance, which results in a distinct reduction in the eroded volume.

Figure 1:
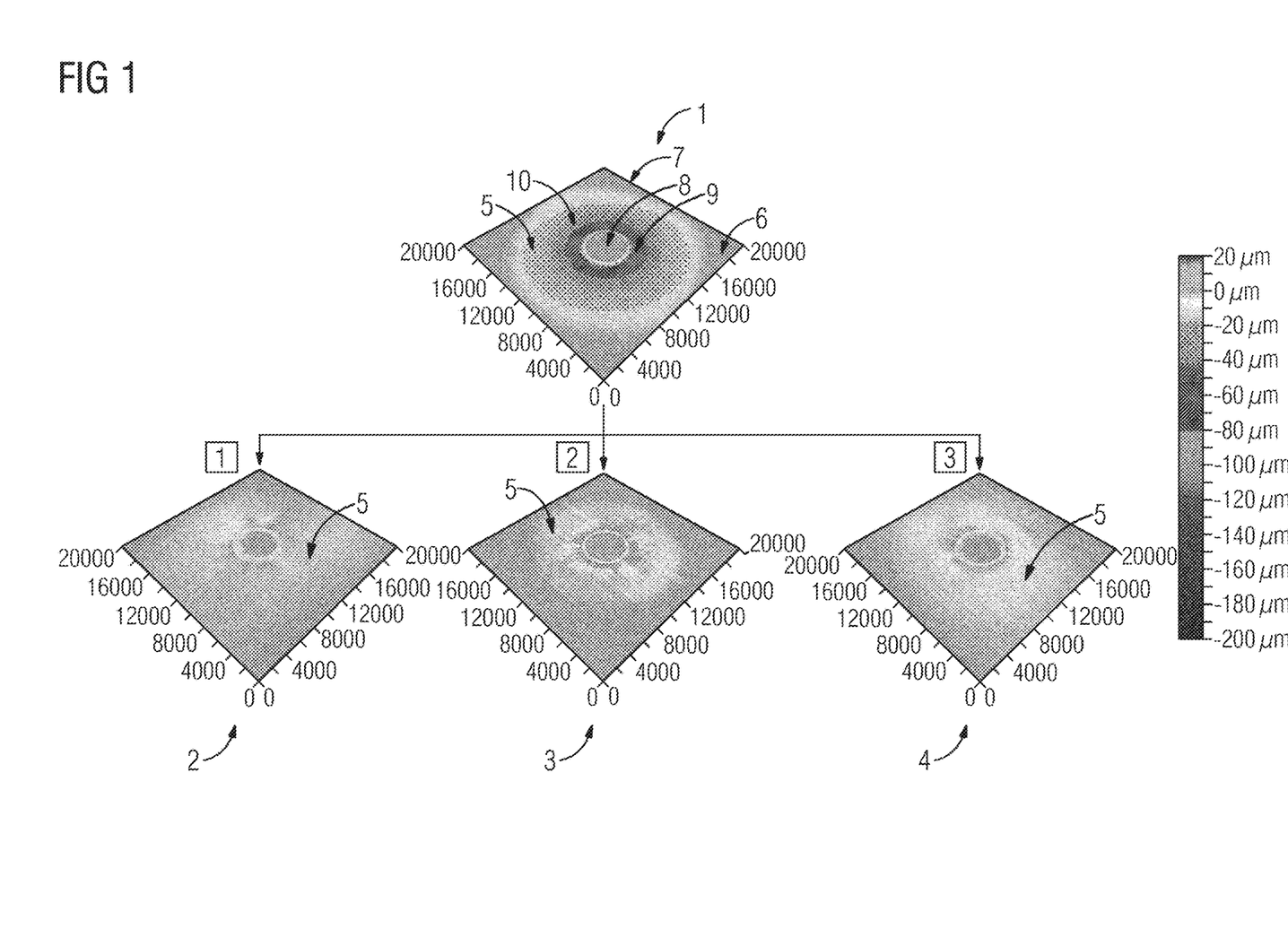
FIG. 1 shows the results of tests, i.e. the reduction in the erosion volume, visualized by a measurement of the surface topography by means of laser triangulation.

In FIG. 1, specimen 1 with an insulation system prepared according to the prior art from an anhydride-cured epoxy resin is seen at the top. What are shown are test applications of the respective insulation systems, embodiments applied to a conductor and tested under the abovementioned conditions for their partial discharge resistance—i.e. for the degree of breakdown of the carbon-based resin components to volatile CO$_2$.

In FIG. 1, specimen 1 shows the prior art. A circle 8 is apparent in the middle, illustrating the application area of the metallic conductor. This is adjoined by a red circle 3, indicating an erosion depth of −40 μm to −80 μm, as shown by the legend on the right-hand margin of FIG. 1. This is surrounded by a two-dimensional yellow circle 4, indicating an erosion depth of −30 to −10 μm. The two-dimensional yellow circle 4 is adjoined by a white circle 5 that indicates zero erosion. The circle 5 has a radius that encircles the entire test area of the specimen 1 and touches the edges 7 of the specimen 1. 6 identifies the regions in the representation where there was no erosion.

Below the comparative specimen with a pure carbon-based resin-curing agent insulation system, FIG. 1 shows the specimens 2, 3 and 4 that show illustrative embodiments of the teachings herein that were tested simultaneously with specimen 1 above under identical conditions. The specimens relate to three embodiments in which a portion, 20 mol %, of the epoxy resin and/or curing agent component has been replaced: in the case of specimen 2 by siloxane-containing component [1], DGTMS; in the case of specimen 3 in the middle by siloxane-containing component [2], an at least difunctionalized, glycidoxy-terminated phenylmethylsiloxane monomer, for example the commercial Silres® product from Wacker AG; and in the case of specimen 4 on the right by the siloxane-containing component [3], Silikoftal®.

FIG. 1 shows an average reduction in the erosion volumes by partial—20% here—replacement of the conventional epoxy resin by a component having a —[SiR$_2$—O]$_n$— backbone by about a factor of 9, which is simply sensational. It is thus possible to dispense with the conventional mica tapes and to replace all or some components of the insulation system, i.e. internal potential controller, main insulation, outer corona shield and/or terminal corona shield, with mica tape-free insulation systems and hence to change the method of application from manual work to automated spraying.

But there are various means of spray application of the partial discharge-resistant lacquer. In the case of spraying in the form of powder coating, the resin mixture, the resin-curing agent mixture and/or the resin-curing agent-accelerator mixture are in solid form at room temperature and/or under standard pressure. When they hit the substrate, i.e. the partial conductors of the coil, the material is thermally melted again.

In some embodiments, a siloxane-containing component of relatively high molecular weight, i.e., for example, one that has been chain-extended, and which is solid at room temperature is advisable. In some embodiments, it is possible, for example, to use homopolymerizing, siloxane-containing epoxides that do not need any additional curing agents. But if a curing agent is to be added, the curing agent or the curing agent-resin mixture may also be solid at room temperature and/or standard pressure. These formulations sprayable as a powder coating that are in solid form at room temperature may then be applied for example by means of fluidized bed spraying and/or electrostatic spraying.

Curing agents used may be the following materials that are solid at room temperature and/or standard pressure:
  a) di- or trianhydrides,
    3,3',4,4'-benzophenonetetracarboxylic dianhydride, "BTDA", CAS No. 2421-28-5;
    pyromellitic dianhydride, "PMDA" CAS No. 89-32-7;
    3,3',4,4'-biphenyltetracarboxylic dianhydride "s-BPDA" CAS No. 2420-87-3;
    2,2'-bis(3,4-dicarboxyphenyl)hexafluoropropanoic dianhydride "6-FDA" CAS No. 1107-00-2;
    4,4'-oxydiphthalic anhydride "ODPA" CAS No. 1823-59-2;
    3,3',4,4'-diphenylsulfonetetracarboxylic dianhydride "DSDA" CAS No. 2540-99-0;
    4,4'-bisphenol A dianhydride "BPADA" or "ULTEM™" dianhydrides CAS No. 38103-06-9;
    hydroquinonediphthalic anhydride "HQDEA" CAS No. 17828-53-4;
    hexahydrophthalic anhydride "HHPA" CAS No. 85-42-7;
    tetrahydrophthalic anhydride isomers of THPA, CAS No. 2426-02-0 and CAS No. 935-79-5;
    cyclopentene-1,2-dicarboxylic anhydride CAS No. 3205-94-5;
    cis/trans isomers of 1,2-cyclopentanedicarboxylic anhydride, e.g. CAS No. 35878-28-5.
  b) difunctional or higher-functionality amines and derivatives thereof, for example:
    2,2-bis[4-(4-aminophenoxy)phenyl]propane "BAPP" CAS No. 13080-86-9;
    4,4'-methylenedianiline "MDA" CAS No. 101-779;
    4,4'-[1,3-phenylenebis(1-methylethylidene)]bisaniline "bisaniline M" CAS No. 2687-27-6;
    4,4'-[1,4-phenylenebis(1-methylethylidene)]bisaniline "bisaniline P" CAS No. 2716-10-1)
    4,4'-oxydianiline "4,4'-ODA" CAS No. 101-80-4;
    3,4'-oxydianiline "3,4'-ODA" CAS No. 2657-87-6;
    2,2'-dimethyl-4,4'-diaminobiphenyl "m-tolidine" CAS No. 84-67-3;
    3,3'-dimethyl-4,4'-diaminobiphenyl "o-tolidine" CAS No. 119-93-7;
    3,3'-dihydroxy-4,4'-diaminobiphenyl "HAB" CAS No. 2373-98-0;
    3,3'-diaminodiphenyl sulfone "3,3'-DDS" CAS No. 599-61-1;
    4,4'-diaminodiphenyl sulfone "4,4'-DDS" CAS No. 80-08-0;
    2,2'-bis[4-(4-aminophenoxy)phenyl] sulfone "BAPS" CAS No. 13080-89-2;
    2,2'-bis[4-(3-aminophenoxy)benzene] "m-BAPS" CAS No. 30203-11-3;
    1,4-bis(4-aminophenoxy)benzene "TPE-Q" CAS No. 3491-12-1;
    1,3-bis(4-aminophenoxy)benzene "TPE-R" CAS No. 2479-46-1;
    1,3'-bis(3-aminophenoxy)benzene "APB-133" CAS No. 10526-07-5;
    4,4'-bis(4-aminophenoxy)biphenyl "BAPB" CAS No. 13080-85-8;
    4,4'-diaminobenzanilide "DABA" CAS No. 785-30-8;
    9,9'-bis(4-aminophenyl)fluorene "FDA" CAS No. 15499-84-0;
    O-tolidine sulfone "TSN" CAS No. 71226-58-9;
    methylenebis(anthranilic acid) "MBAR" CAS No. 7330-46-3;
    1,3'-bis(4-aminophenoxy)-2,2-dimethylpropane "DANPG" CAS No. 115570-52-0
    and derivatives thereof. It is also possible to use high-melting isocyanates, esterimides, etherimides, ester-amides.

In some embodiments, the solid anhydride derivatives and especially amine derivatives as curing agents provide prior melting, especially a single instance thereof, with an epoxy resin and/or siloxane epoxy resin which is solid at room temperature and/or standard pressure and/or under standard conditions gives rise to a melt that solidifies homogeneously. A solidified melt obtained in this way can be pulverized again immediately or after storage, is easy to mix stoichiometrically and has the best possible shelf life in blended form. On spraying and on encountering the hot metal surface, the powder which has been produced from the solidified melt—for example—melts again and begins to crosslink immediately. Particularly the amine derivatives mentioned then do not require any long-lasting oven curing periods either, but merely post-curing phases in the form of short segments at significantly lower temperatures.

In some embodiments, it is also possible to spray a liquid lacquer, i.e. the resin-curing agent system in liquid form or dissolved in a solvent. This spraying can be effected using compressed air or without compressed air. Spraying with solvent provides a distinct rise in the viscosity of the resin-curing agent mixture when the solvent evaporates. This means that, when the resin-curing agent mixture has been sprayed onto a hot metal surface, its viscosity rises to such an extent that it can no longer run.

On the other hand, the spraying of solvent-containing mixtures requires wait periods between two successive applications, for it to be ruled out that solvent is still present in a lower layer. This is especially because solvent in a lower layer in the course of curing at elevated temperature would lead to pore formation, in which there is then a risk of electrical discharges in the course of operation.

In the case of spraying without solvent, no wait periods would be necessary, and it would be possible to spray multiple layers one on top of another relatively quickly until the desired insulation thickness has been attained. Without solvent, there will also be no outgassing of any low molecular weight constituent in the course of heating of the insulation system, by means of which a pore-free insulation system is producible. For there to be an increase nevertheless in the viscosity of the sprayed resin-curing agent system after the spraying, it is suggested that the sprayed resin-curing agent system be partly gelated by means of UV and/or IR curing when it hits the surface to be coated. Whether with or without solvent, the lacquer sprayed on is ultimately subjected to post-curing for completion, which can be effected thermally and/or via irradiation.

In some embodiments, a sprayed layer of the insulation system may have a thickness in the range from 50 μm to 150 μm, 50 μm to 130 μm, and/or from 70 μm to 120 μm. In the case of electrical rotating machines such as those in the focus of the present invention, insulation thicknesses in the range from 700 μm up to about 6 mm are required, such that the sprayed insulation systems always have to be applied in multiple layers.

In some embodiments, the sprayable formulation includes at least one polymerizable component comprising a resin-curing agent system, and one or more fillers. A polymerizable component is understood to mean a mixture of at least one compound containing a —[SiR$_2$—O—]$_n$— containing backbone and one compound containing a —[—CH$_2$-]$_n$— containing backbone. In some embodiments, the polymerizable component is selected from thermosets and/or thermoplastics.

Solvents present in the sprayable liquid formulation may include 2-butanone, acetone and/or 1-butanol.

By virtue of the use of fine mica as filler, the particles formed therefrom have comparatively low abrasiveness, and they can therefore be sprayed in a simple manner in the form of a particle-lacquer suspension by means of a nozzle onto a conductor in order to obtain an insulation system. A sprayed formulation, whether in the form of a powder coating or in the form of a liquid formulation with or without solvent, especially for production of the main insulation, enables partly or fully automated production of the insulation system, including of insulation systems adapted individually to the respective machine.

In some embodiments, spray methodology enables an increase in the power density of electrically rotating machines, assuming that the sprayed insulation system has the same electrical lifetime as a conventional insulation system comprising corona shield tape, tape adhesive, tape accelerator, winding applied by hand in some cases, followed by resin impregnation, optionally under reduced pressure, and ultimately full resin curing. The reason for that lies in the resulting insulation geometry which is the inevitable result when a tape is wound around a square profile of a conductor 13, for example lamination stack 12 considered by way of example in the position of the conductors in FIGS. 2 and 3.

Figure 2:
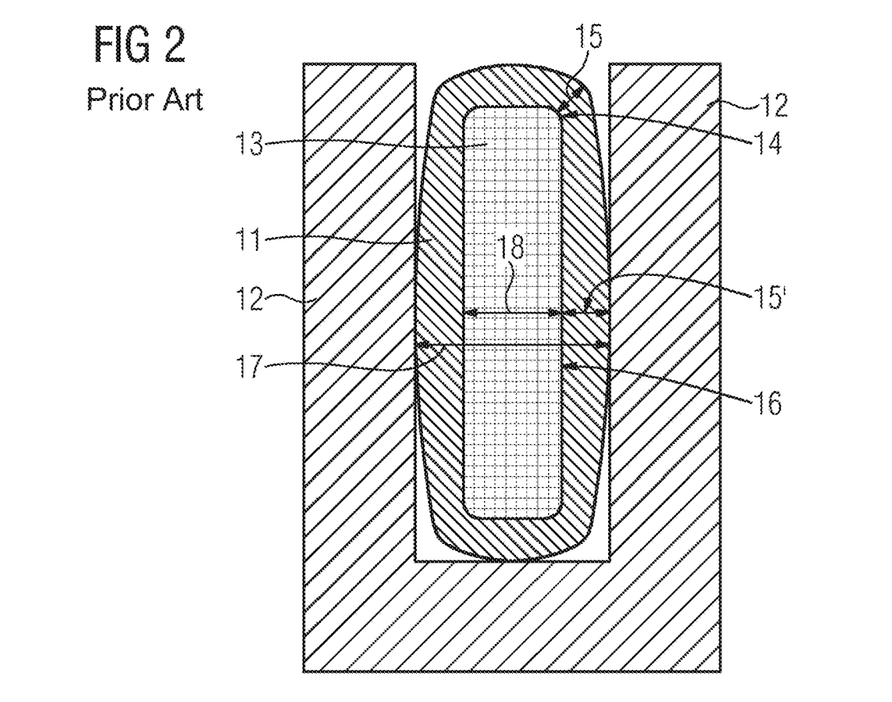
FIG. 2 shows a prior art mica tape insulation wound around a conductor.

FIG. 2 shows a prior art, conventionally used wound insulation system 11 around the square profile of the conductor 13, for example a copper conductor, in the laminated stack 12. It is shown here in detail how the winding thickness 15 is lower at the edges than the winding 15' on the flat side. This is a simple consequence of the winding 15, which simply lies tighter to the edges 14 than to the flat sides 16. For example, a winding thickness 15 of 2.2 mm is measured at the edge 14, whereas a winding thickness 15 of 2.7 mm is measurable at the flat side 16.

But the electrical field strength at curves and especially at edges 14 is naturally always much higher than on flat components or regions such as the flat side 16. It has been shown that, in 95% of all electrical breakdowns of an insulation system, especially at elevated voltages, the insulation breaks down at the bar radius, i.e. at the edge 14 in the example shown here. This means that an insulation system should sensibly be designed such that it has the insulation thickness corresponding to the expected lifetime of the edge 14. In the prior art shown here, this means quite clearly that the other regions, especially the flat regions, must be much thicker than required for electrical purposes. This gives rise to unnecessary material costs, component volumes, unnecessary hindrance of thermal cooling, reduction of power density and, overall, worsening of the machine.

Figure 3:
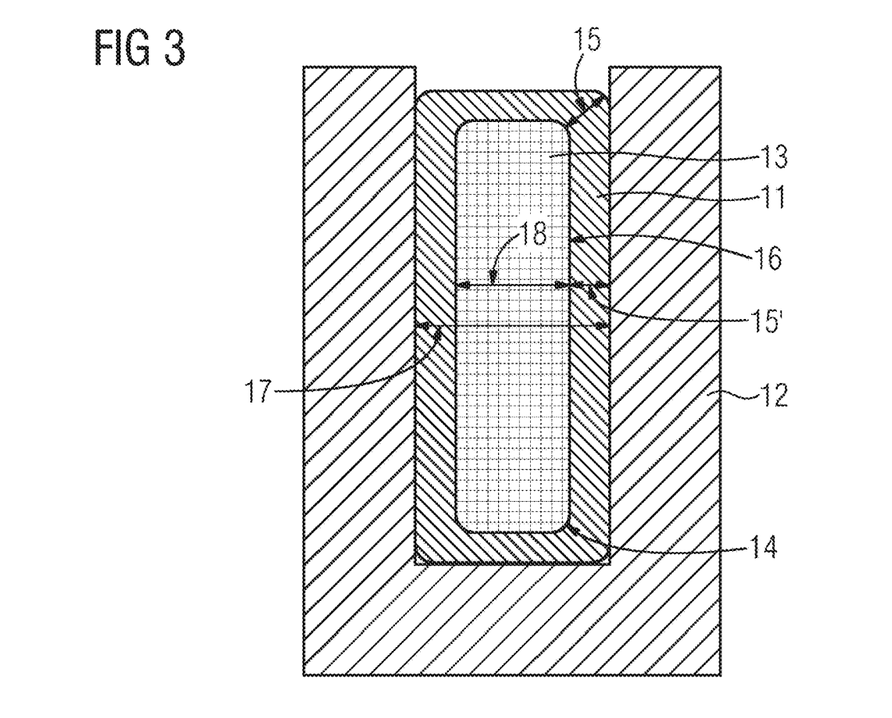
FIG. 3 shows a spray insulation applied in the form of a sprayable formulation according to teachings of the present disclosure.

FIG. 3 shows, by contrast, the sprayed-on insulation system according to a working example of the invention. This again shows the square profile 13 of the conductor, but no longer the wound insulation system and instead the sprayed insulation system 11 according to the invention in the lamination stack 12. By virtue of the specific technique of spraying, it is possible, as shown in FIG. 3, to increase the insulation thicknesses 15 at the edges 14 and in this way, for example, to save material at the flat sides 16. For example, it is possible at the edges 14 to achieve insulation thicknesses 15 of 2.4 mm without difficulty by spraying, while simultaneously enabling reduction in the insulation thickness 15' at the flat sides 16 according to the lower probability of electrical breakdown, for example, to 2.2 mm.

By virtue of the reduction in the insulation thickness 15' at the flat sides 16, however, it is possible to distinctly increase the thickness 18 of the conductor 13 and hence the current rating of the conductor 13, by more than 8% in the example shown, by 8.3%. In the case of a total thickness 17 of the conductor 13 insulated with the insulation system 11 that has been sprayed or produced by winding in the lamination stack 12 of 17.4 mm, for example, the conductor 13 according to the prior art, i.e. FIG. 2, can assume a maximum width 18 of 12 mm, whereas, according to the invention, as shown in FIG. 3, it may have a width of up to one mm more, i.e. a width 18 of 13 mm. Such an enlarged conductor 13 may of course also transport different levels of current. By means of the sprayable insulation, especially also main insulation, it is accordingly possible to generate very distinct increases in power of electrical rotating machines.

The comparison of the wound and sprayed insulation correspondingly shows a distinct optimization of power by means of the sprayable insulation in an electrical rotating machine. The present disclosure of a sprayable formulation for production of an insulation system for an electrical machine, especially a rotating electrical machine in the high-voltage or mid-voltage sector, for example a generator and/or motor, which is subjected to higher rated voltages at operating voltages, i.e., for example, over and above 1 kV or more, and the insulation system producible therefrom. The process for producing the insulation system comprises a spraying operation and is thus automatable.

The invention claimed is:

1. A sprayable formulation for an insulation system of an electrical machine, the formulation comprising a sprayable resin mixture including:

a diepoxidic carbon-based first resin component; and a second resin component based on alkyl-/arylpolysiloxane with at least one glycidyl ester and/or glycidyl ether functionality; and a curing agent based on at least one of: anhydride, (poly)amine, and amino- and/or alkoxy-functional alkyl-/arylpolysiloxane.

2. The formulation as claimed in claim 1, wherein the formulation is in solid form at room temperature and/or standard pressure and therefore sprayable as a powder coating.

3. The formulation as claimed in claim 1, wherein the formulation is in liquid form at room temperature and/or standard pressure.

4. The formulation as claimed in claim 3, further comprising a solvent.

5. The formulation as claimed in claim 3, comprising no solvent.

6. The formulation as claimed in claim 1, further comprising a second curing agent including a di- and/or trianhydride and/or one or more derivatives thereof.

7. The formulation as claimed in claim 1, further comprising a second curing agent including a difunctional and/or higher-functionality amine and/or one or more derivatives thereof.

8. The formulation as claimed in claim 1, further comprising one or more filler fractions.

9. The formulation as claimed in claim 1, further comprising a nanoparticulate filler fraction and an additive.

10. The formulation as claimed in claim 9, wherein the additive provides at least partial sintering of nanoparticles in the nanoparticulate filler fraction to form a barrier layer in the event of electrical partial discharges.

11. An electrical rotating machine comprising:
a conductor;
a lamination stack;
an insulation system including a main insulation;
an internal potential controller; and
an outer corona shield and/or a terminal corona shield;

wherein the insulation system includes a formulation comprising a cured resin mixture including:
a diepoxidic carbon-based first resin component; and
a second resin component based on alkyl-/arylpolysiloxane with at least one glycidyl ester and/or glycidyl ether functionality; and
a curing agent based on at least one of: anhydride, (poly)amine, and amino- and/or alkoxy-functional alkyl-/arylpolysiloxane.

12. A method for producing an insulation system of an electrical rotating machine, the method comprising:
spraying a resin mixture including:
a monomeric and/or oligomeric, at least diepoxidic carbon-based first resin component; and
a monomeric and/or oligomeric second resin component based on alkyl-/arylpolysiloxane with at least one glycidyl ester and/or glycidyl ether functionalities; and
a curing agent and based on at least one of: anhydride, (poly)amine, and amino- and/or alkoxy-functional alkyl-/arylpolysiloxane; and
curing the resin mixture.

13. A method for producing an insulation system of an electrical rotating machine, the method comprising:
producing a formulation comprising a sprayable resin mixture including:
a monomeric and/or oligomeric, at least diepoxidic carbon-based first resin component; and
a monomeric and/or oligomeric second resin component based on alkyl-/arylpolysiloxane with at least one glycidyl ester and/or glycidyl ether functionalities; and
a curing agent and based on at least one of: anhydride, (poly)amine, and amino- and/or alkoxy-functional alkyl-/arylpolysiloxane;
spraying the formulation onto a conductor;
drying and/or partly gelating the formulation on the conductor;
repeating spraying and drying and/or partly gelating; and
curing the formulation to form the insulation.

\* \* \* \* \*